US005635302A

United States Patent [19]
Budde et al.

[11] Patent Number: 5,635,302
[45] Date of Patent: Jun. 3, 1997

[54] SUBSTRATE HAVING COATING RESISTANT TO ENVIRONMENTAL ETCH, COATING COMPOSITION THEREFOR, PROCESS FOR MAKING THE COATING COMPOSITION, AND PROCESS OF COATING A SUBSTRATE WITH THE COMPOSITION

[75] Inventors: Anna M. Budde, Livonia; James A. Laugal, Union Lake; Walter H. Ohrbom, Southfield; Marvin L. Green, Brighton; Mark R. Montagne, Southfield, all of Mich.

[73] Assignee: BASF Corporation, Southfield, Mich.

[21] Appl. No.: 458,053

[22] Filed: Jun. 1, 1995

Related U.S. Application Data

[62] Division of Ser. No. 699,297, Apr. 19, 1991.

[51] Int. Cl.$^6$ .................. B32B 15/08; C08F 224/00; C08F 222/06; C08F 232/08; C08F 226/02; C08F 220/06; C08F 225/10

[52] U.S. Cl. .................. 428/461; 526/270; 526/271; 526/273; 526/281; 526/312; 526/317.1; 526/328.5; 428/462

[58] Field of Search .................. 526/270, 271, 526/273, 281, 312, 317.1, 328.5; 428/461, 462

[56] References Cited

U.S. PATENT DOCUMENTS 4,131,572  12/1978  Brendley, Jr. .................. 525/210

*Primary Examiner*—Joseph L. Schofer
*Assistant Examiner*—Wu C. Cheng
*Attorney, Agent, or Firm*—Paul L. Marshall; Anne Gerry Sabourin; Anna M. Budde

[57] ABSTRACT

A sterically-hindered monomer is used to make a polymer which in turn is useful in coating compositions. The resulting residue of the sterically-hindered monomer is present in the polymer, as well as in a cured coating (preferably an automotive coating) produced using a coating composition having the polymer therein. The presence of the residue of the sterically-hindered monomer imparts in the cured coating a resistance to environmental etching.

11 Claims, No Drawings

SUBSTRATE HAVING COATING RESISTANT TO ENVIRONMENTAL ETCH, COATING COMPOSITION THEREFOR, PROCESS FOR MAKING THE COATING COMPOSITION, AND PROCESS OF COATING A SUBSTRATE WITH THE COMPOSITION

This is a divisional of copending application(s) Ser. No. 07/699,297 filed on Apr. 19, 1991. Pending

BACKGROUND OF THE INVENTION

The present invention relates to a polymer and a composition suitable for producing a cured coating resistant to environmental etch, a process for making the composition, a process for coating the substrate with the composition, and to a substrate having a coating which is resistant to environmental etching. More particularly, the present invention utilizes polymers produced from one or more sterically-hindered monomers which are capable of copolymerizing under the reaction conditions employed.

The use of addition polymers such as acrylic polymers in coatings formulations, particularly in topcoats for the automotive market, has been widespread. One of the primary requirements of such a coating for the automotive market is that it be durable. That is, the coating must resist degradation due to environmental elements which it comes into contact with, such as sunlight, gasoline, and environmental fallout such as dew, rain, or particulate matter of any kind. It has been recognized that prior art coating compositions are deficient in their ability to withstand degradation from elements which have generally and unanalytically been lumped together in the category of "environmental" causes of degradation. This sort of degradation has manifested itself in an etching or pitting of the coating's surface, and has resulted in the necessity of the automotive manufacturers to repair the coatings under warranty claims. However, in spite of the recognized deficiencies of prior art polymers and coating compositions, as well as economic penalty of such deficiencies, a long felt need for such a polymer for producing a cured topcoat resistant to environmental etch has heretofore gone unsatisfied.

The present invention provides a process of coating a substrate suitable for producing cured coatings resistant to environmental etch. In general, the coating composition comprises a sterically-hindered monomer which is ethylenically unsaturated and an ethylenically unsaturated comonomer having a functional site capable of undergoing crosslinking after the resin is formed. The amount of the sterically-hindered monomer reacted may range from about 20 to 80 weight percent, based on the total weight of the polymer. The theoretical $T_g$ (i.e., glass transition temperature) of the polymer may range from about 10° C. to about 70° C. This polymer may be utilized in forming a coating composition along with other reactive components.

BRIEF SUMMARY OF THE INVENTION

The present invention relates to:

(1) a coating composition, (2) a process for making the coating composition, (3) a process for coating a substrate, and (4) a coated article.

In each of the composition, processes, and article of the present invention, the coating provides the advantage of resistance to environmental etch.

The coating composition of the present invention comprises a polymer, wherein from about 75 weight percent to about 100 weight percent of the polymer consists of a residue of a sterically-hindered monomer and a residue of an ethylenically unsaturated comonomer. The sterically-hindered monomer is at least one monomer selected from the group consisting of: (1) a first sterically-hindered monomer, wherein the first monomer is an ethylenically unsaturated carboxylic ester, and (2) a second sterically-hindered monomer wherein the second monomer is a vinyl monomer. The sterically-hindered vinyl monomer residue is present in an amount of 0 to about 50 weight percent, based on the weight of the polymer. The ethylenically unsaturated comonomer has a functional site capable of undergoing cross-linking after forming the polymer.

The process for making the coating composition comprises the steps of: (1) making the polymer, and (2) combining the polymer with at least one member selected from the group consisting of crosslinkers, additional crosslinkable polymers, catalysts, organic solvents, and uv-light stabilizers. About 75 weight percent to about 100 weight percent of the polymer consists of a residue of a sterically-hindered monomer and a residue of an ethylenically unsaturated comonomer. The sterically-hindered monomer is at least one monomer selected from the group consisting of: (1) a first sterically-hindered monomer, wherein the first monomer is an ethylenically unsaturated carboxylic ester, and (2) a second sterically-hindered monomer, wherein the second monomer is a vinyl monomer. The sterically-hindered vinyl monomer residue is present in an amount from 0 to 50 weight percent, based on the weight of the polymer. The ethylenically unsaturated comonomer has a functional site capable of undergoing crosslinking after forming the polymer.

The coated article of the present invention comprises a substrate having a cured coating thereon. The cured coating comprises a sufficient amount of both a residue of a sterically-hindered monomer and a residue of an ethylenically unsaturated comonomer. The amounts of the residues of the monomer and the residue of the comonomer are sufficient to produce a coating exhibiting an enhanced environmental etch resistance. Any sterically-hindered vinyl monomer residue in the cured coating is present in the amount of from 0 to 67 weight percent, based on a total of the weight of the sterically-hindered monomer residue and the ethylenically unsaturated comonomer residue, which are present in the coating.

It is an object of the present invention to provide a process for making a coating which is resistant to environmental etch.

It is a further object of the present invention to provide a process in which the resistance to environmental etch is accomplished by preparing a polymer comprising a sufficient amount of a residue of a sterically-hindered monomer which is an ethylenically unsaturated carboxylic ester, or a vinyl monomer, or a combination of the two.

It is a further object of the present invention to produce a coated article having a coating thereon which is resistant to environmental etch.

It is a further object of the present invention to produce a coated article having a coating thereon which is resistant to environmental etch, wherein the coating comprises a sufficient amount of a polymer which contains a residue of a sterically-hindered monomer which is an ethylenically unsaturated carboxylic ester, or a vinyl monomer, or a combination of the two.

DETAILED DESCRIPTION OF THE INVENTION

Compositions of the present invention produce cured coatings having reduced susceptibility to environmental etching. Environmental etching, in relation to the present invention, means film degradation caused by environmental, physical and/or chemical changes as evidenced by indented ring patterns or individual pits where the clearcoat surface is disrupted and portions have been removed.

The cause of environmental etching is believed to be water and heat induced stress in the cured coating and/or hydrolysis of the cured coating. It has been discovered that coating compositions containing polymers prepared from a sterically-hindered monomers have an increased resistance to environmental etch. This increased etch resistance is achieved even when such polymers are prepared with monomers which are susceptible to degradation, in addition to sterically-hindered monomers.

The polymer utilized in the process and product of the present invention contains the residues of a sterically-hindered monomer, which may be an ethylenically unsaturated carboxylic ester and/or a vinyl monomer, and an ethylenically unsaturated comonomer having a functional site capable of undergoing crosslinking after polymerization. The phrase "sterically-hindered monomer" is herein defined as any monomer which comprises a branched carbon chain or cyclic structure. The result of this polymerization is a "reactive polymer" in that the polymer can thereafter react with a crosslinker (i.e., any species which reacts to bridge two polymer molecules) during a curing step in the process, whereby a cured coating is produced.

Preferably, the residues of the sterically-hindered monomer and the comonomer comprise at least 90 percent by weight of the polymer. In general, the polymer has a weight average molecular weight ranging from about 3,000 to about 20,000, preferably from about 3,000 to 10,000 and most preferably about 3,500 to 7,000. The polymer has an average number of functional sites capable of undergoing crosslinking of from about 5 to 100, and preferably from abut 5 to about 30 per polymer molecule. Preferably, the polymer has a theoretical $T_g$ ranging from about 10° C. to about 70° C., more preferably from about 15° C. to about 65° C., and most preferably from about 25° C. to about 60° C. If the polymer is incorporated in a coating composition with other reactive components, the polymer is preferably present in an amount of from about 35 to about 85, more preferably from about 50 to about 80, and most preferably from about 55 to about 80 weight percent of a total amount of reactive components present in the coating composition. The term "reactive components" as used herein encompasses the polymer of the invention and the crosslinker, as well as any other species present which can react with either the polymer or the crosslinker during the curing step to become a part of the crosslinked network.

Sterically-hindered ethylenically unsaturated monomers suitable for producing the polymers of the present invention include esters of acrylic or methacrylic acid derived from sterically-hindered alcohols, or sterically-hindered vinyl monomers. Both acrylic acid esters and methacrylic acid esters are commonly referred to as "acrylic monomers" or "acrylates". The sterically hindered alcohols may be aliphatic branched or cyclic alcohols, or aromatic alcohols.

Aliphatic branched acyclic esters of acrylic or methacrylic acid suitable as monomers may be made from one or more branched acyclic alcohols, either saturated or unsaturated. The saturated alcohol(s) may be selected from the following group: tert-amyl alcohol, 2-methyl-1-butanol, 3-methyl-1-butanol, neopentyl alcohol, 3-methyl-2-butanol, 2-pentanol, 3-pentanol, 2,3-dimethyl-2-butanol, 3,3-dimethyl-1-butanol, 3,3-dimethyl-2-butanol, 2-ethyl-2-butanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-(2-hexyloxyethoxy) ethanol, tert-butyl alcohol, 2,2-dimethyl-3-pentanol, 2,3-dimethyl-3-pentanol, 2,4-dimethyl-3-pentanol, 4,4-dimethyl-3-pentanol, 3-ethyl-3-pentanol, 2-heptanol, 3-heptanol, 2-methyl-2-hexanol, 2-methyl-3-hexanol, 5-methyl-2-hexanol, 2-ethyl-1-hexanol, 4-methyl-3-heptanol, 6-methyl-2-heptanol, 2-octanol, 3-octanol, 2-propyl-1-pentanol, 2,4,4-trimethyl-1-pentanol, 2,6-dimethyl-4-heptanol, 3-ethyl-2,2-dimethyl-3-pentanol, 2,-nonanol, 3,5,5-trimethyl-1-hexanol, 2-decanol, 4-decanol, 3,7-dimethyl-1-octanol, 3,7-dimethyl-3-octanol, 2-dodecanol, and 2-tetradodecanol. Additional alcohols include commercial mixtures of branched alcohols such as the following alcohols which are available from Exxon Corporation as: Exxal 6 (a mixture of branched hexyl alcohols), Exxal 7 (a mixture of branched heptyl alcohols), Exxal 8 (a mixture of branched octyl alcohols), Exxal 9 (a mixture of branched nonyl alcohols), Exxal 10 (a mixture of branched decyl alcohols), Exxal 12 (a mixture of branched dedecyl alcohols), and Exxal 13 (a mixture of branched tridecyl alcohols). The unsaturated alcohol(s) may be selected from the following group: citronellol, 1-hexen-3-ol, phytol, 3-methyl-1-penten-3-ol, 4-methyl-3-penten-1-ol, 2-methyl-3-buten-1-ol, 3-methyl-3-buten-2-ol, 3-methyl-2-buten-1-ol, 3-methyl-3-buten-1-ol, 1-penten-3-ol, 3-penten-2-ol, 4-penten-2-ol, 6-methyl-5-hepten-2-ol, 1-octen-3-ol, nopol, and oleyl alcohol. Aliphatic cyclic esters of acrylic or methacrylic acid suitable as monomers may be made from one or more cyclic alcohols, either saturated or unsaturated. Aliphatic cyclic esters of acrylic or methacrylic acid suitable as monomers may be made from one or more cyclic alcohols, either saturated or unsaturated. The cyclic alcohol (s) may be selected from the following group: 2-t-butyl cyclohexanol, 4-t-butyl cyclohexanol, 4-cyclohexyl-1-butanol, isomenthol, 3,3,5,5-tetramethyl cyclohexanol, cyclohexanol, cyclopentane methanol, 1-methylcyclopentanol, 2-methylcyclopentanol, 3-methylcyclopentanol, cyclobutane methanol, cyclopentanol, 1-adamantaneethanol, 1adamantanemethanol,1-adamantanol, 2-methyl-2-adamantanol, 3,5-dimethyl-1-adamantanol, cyclododecanol, cycloundecanemethanol, dicyclohexylmethanol, cyclododecanemethanol, myrtenol, verbenol, borneol, chrysanthemyl alcohol, isoborneol, isopinocampheol, p-menth-1-en-9-ol, menthol, neomenthol, terpinen-4-ol, a-terpineol, 3-methyl-2-cyclohexen-1-ol, cycloheptanol, cyclohexylmethanol, 1-methylcyclohexanol, cycloheptane methanol, 1-cyclohexylmethanol, 2-cyclohexylmethanol, cyclooctanol, 3-cyclopentyl-1-propanol, 2,3-dimethylcyclohexanol, 4-ethyl cyclohexanol, 3-cyclohexyl-1-propanol, fenchyl alcohol, 1,3,3-trimethyl-2-norbornanol, myrtanol, neomenthol, menthol, tricyclohexylmethanol, 9-ethylbicyclo[3.3.1]nonan-9-ol, a-methyl cyolopropane methanol, 1-methyl cyclopropane methanol, and 2-methyl cyclopropane methanol.

Aromatic esters of acrylic or methacrylic acid suitable as monomers may be made from one or more aromatic alcohols. The aromatic alcohol(s) may be selected from the following group: 2-cyclopentylphenol, trans-2-phenyl-1-cyclohexanol, 6-phenyl-1-hexanol, 3,5,-bis (tetrafluoromethyl)benzyl alcohol, 2,6-di-tert-butyl-4-methylphenol, nonylphenol, cyclopropyldiphenylmethanol, 2,4,6-tri-tert-butylphenol, 1,1,1,3,3,3-hexafluoro-2-phenyl-2-propanol, 2-bromo-1-indanol, 1-indonal, 2-indanol, 5-indanol, 3-chloro-1-phenyl-1-propanol, 3,5,-dimethylbenzyl alcohol, 1-phenyl-2-propanol, 2-isopropylphenol, 1,2,3,4-tetrahydro-1-naphthol, 5,6,7,8-tetrahydro-1-naphthol, 5,6,7,8-tetrahydro-2-naphthol, 2,3-dihydro-2,2-dimethyl-7-benzofuranol, 2-sec-butylphenol, 2-tert-butylphenol, 3-sec-butylphenol, 3-tert-butylphenol, 4-sec-butylphenol, 4-tert-butylphenol, 2,3,5-trimethyl phenol, and 2-methoxyphenylethyl alcohol.

Sterically-hindered vinyl monomers which are suitable for making the polymers of the present invention include: styrene, 4-phenylstyrene, vinylcyclohexane, vinylcyclooctane, vinylcyclopentane, vinyl-2-ethylhexanoate, 5-vinyl-2-norborene, limonene, tert-butyl styrene, α-methylstyrene, 4-methylstyrene, vinyltoluene, ethylidene norborene, and alkylated or alkoxylated styrenes wheren the alky or alkoxy group has from 1 to 8 carbons.

In general, the composition of the present invention comprises a residue of the sterically hindered vinyl monomer in an amount of from about 0 weight percent to about 50 weight percent, based on the weight of the polymer. Although the residue of the sterically-hindered monomer may, in general, be present in an amount of from 0 weight percent to 50 weight percent, preferably the residue of the sterically-hindered vinyl monomer is present in an amount of from 0 weight percent to about 25 weight percent, based on the weight of the polymer. However, the use of a sterically-hindered vinyl monomer is neither (1) required to make the polymer used in the process of the present invention, nor (2) is the residue of which required in the composition of the present invention, nor (3) is the residue of which required in the article of the present invention. If the amount of the residue of the sterically hindered vinyl monomer is substantially greater than 25 weight percent based on the weight of the polymer, the result may be a "loss of gloss" (i.e. chalking) of the coating. However, the use of sterically-hindered vinyl monomers to make the composition of the present invention may be desirable (despite the potential for chalking) because certain vinyl monomers, such as styrene, are economically advantageous.

Suitable ethylenically unsaturated comonomers having a functional site capable of undergoing crosslinking include, for examples, those with hydroxyl, isocyanate, oxirane, carboxylic acid, and acid anhydride functionalities. Examples of such compounds are acrylic acid, methacrylic acid, hydroxyethyl acrylate, hydroxyethyl methacrylate, hydroxypropyl acrylate, hydroxypropyl methacrylate, hydroxybutyl acrylate, hydroxybutyl methacrylate, glycidyl acrylate, glycidyl methacrylate, isocyanatoethyl methacrylate, acryloxy propionic acid, mixtures of polyacrylic acids, mixtures of polymethacrylic acids, meta-isopropenyl-α,α-dimethylbenzyl isocyanate, and maleic anhydride.

The polymer may be prepared using additional comonomers such as other alkyl acrylates, methacrylates, or vinyl comonomers.

The amount of residue from the sterically-hindered monomer(s) ranges from about 20 to about 80, preferably about 25 to about 70, and more preferably about 30 to about 65 percent by weight based on the total weight of the polymer. Preferably, the amount of residues from the sterically-hindered monomer and from the ethylenically unsaturated comonomer together comprise at least 90 percent by weight of the polymer.

The polymer may be prepared using conventional techniques such as by heating the monomers in the presence of a polymerization initiating agent and optionally chain transfer agents. The polymerization may be carried out in bulk or in solution using conventional solvents such as toluene, ethyl acetate, acetone, methyl isobutyl ketone, methyl ethyl ketone, methyl amyl ketone, mineral spirits, ethylene glycol monoether acetates and other aliphatic, cyloaliphatic and aromatic hydrocarbons, esters, ethers, ketones and other compatible solvents.

Typical initiators are organic peroxides such as dialkyl peroxides, peroxyesters, peroxydicarbonates, diacyl peroxides, hydroperoxides, and peroxyketals; and azo compounds such as 2,2' azobis(2-methylbutanenitrile) and 1,1'-azobis(cyclohexanecarbonitrile). Typical chain transfer agents are mercaptans such as octyl mercaptan, n- or tert-dodecyl mercaptan; halogenated compounds; thiosalicylic acid, mercaptoacetic acid, mercaptoethanol, and dimeric alphamethyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than thirty minutes.

The solvent or solvent mixture is generally heated to the reaction temperature and the monomers and initiator(s) are added at a controlled rate over a period of time, usually between 2 and 6 hours. A chain transfer agent or additional solvent may be added concurrently with the monomers and initiator(s). The mixture is usually held at the reaction temperature after the additions are completed for a period of time to complete the reaction. Optionally, additional initiator may be added to ensure complete conversion. The polymer should have a uniform molecular weight distribution which is evidenced by polydispersity values which are preferably less than 4, more preferably from 1.5 to 2.5.

In order to form a cured coating, the polymer is crosslinked utilizing a one-package system or a two-package system. In a one-package system the polymer is combined with a crosslinker to form a stable paint system at storage temperatures. In a two-package system, the polymer and the crosslinker are kept separate until just prior to or upon application of the composition. The crosslinker must have at least two functional sites which are reactive with the polymer, and the crosslinker may be either monomeric or polymeric in nature. Examples of materials used as crosslinkers are aminoplast crosslinkers, polyepoxides, polyacids, polyols, blocked polyisocyanates (including blocked isocyanurates or blocked biurets of isocyanates), unblocked polyisocyanates (including isocyanurates or biurets of isocyanates), and any compatible mixture thereof. Blocked polyisocyanates have at least two isocyanate groups, and the isocyanate groups are blocked by reaction with active hydrogen bearing blocking agents.

If the polymer has hydroxyl sites, the amount of crosslinking agent utilized ranges from about 15 to about 60 percent by weight of the reactive components. Aminoplast crosslinkers, polyisocyanates, and blocked polyisocyanates are suitable crosslinkers for a polymer having hydroxyl sites thereon. Improved etch resistance is obtained using blends of an isocyanurate of hexamethylene diisocyanate and an isocyanurate of isophorone diisocyanate available from Mobay as N3390 and from Hüls as IPDI-T1890 respectively. If desired, these isocyanate groups can be blocked by reaction with active hydrogen bearing blocking agents. One common type of blocking agent is oximes, such as acetone oxime, methyl isobutyl ketoxime, acetaldehyde oxime and the like. The aminoplast crosslinkers are aldehyde condensation products of melamine, glycoluril, urea, benzoguanamine, or a similar compound. They may be soluble in aqueous or organic solvents. Generally, the aldehyde employed is formaldehyde, although useful products can be made from other aldehydes, such as acetaldehyde, benzaldehyde, and others. Condensation products of melamine or urea are the most common and are preferred, but products of other amines and amides in which at least one amine group is present can also be employed. These aldehyde condensation products contain methylol groups or similar alkylol groups, depending upon the particular aldehyde employed. If desired, these methylol groups can be etherified by reaction with an alcohol. Various alcohols are employed for this purpose, including essentially a monohydric alcohol, although the preferred alcohols are methanol, butanol, and similar lower alkanols having eight carbons or less.

The aminoplast crosslinker can be monomeric or polymeric. One preferred crosslinker which gives a high quality finish is hexamethoxymethyl melamine (available as Cymel 303, sold by American Cyanamid, of Wayne, N.J.), especially for high solids coating compositions. Preferably a polymeric melamine is used as a crosslinker for compositions to be applied over waterborne basecoats. Another useful resin is a methoxy/butoxymethyl melamine (available as Resimene 755 from Monsanto Chemical Co., of Springfield, Mass.).

The polymer and crosslinker may be combined in a coating composition along with other reactive or non-reactive materials and applied to a substrate and then cured as described in U.S. Pat. No. 4,720,528 which is hereby incorporated by reference.

The present invention pertains to a process for making a coating composition, and to the coating composition resulting therefrom. Furthermore, the coating composition further comprises a functional site (i.e. a crosslinkable site) located on a residue of an ethylenically unsaturated comonomer, the functional site being capable of undergoing crosslinking after forming the polymer. The functional site which is present on the ethylenically unsaturated comonomer comprises at least one functionality selected from the group consisting of hydroxyl, isocyanate, oxirane, carboxylic acid, and carboxylic acid anhydride.

The coating composition of the present invention, once applied as a film on a substrate but not yet baked, is present on the substrate in the form of an uncured coating.

As stated in the brief description (supra), the coating composition comprises a polymer which is produced by the polymerization of at least one member selected from the group consisting of: (1) a first sterically-hindered monomer which is an ethylenically unsaturated carboxylic ester and (2) a second sterically-hindered vinyl monomer. Although the resulting polymer in the coating composition may, in general, comprise the residue of the vinyl monomer in an amount of from 0 weight percent to about 50 weight percent, it is preferred that the residue of the vinyl monomer is present in the polymer in an amount of from 0 weight percent to about 25 weight percent, based on the weight of the polymer. This is because with amounts of residue of greater than about 25 weight percent, a detrimental "loss of gloss" (i.e. chalking) may result. Such a loss of gloss is considered to be a form of coating deterioration which is completely different from environmental etching.

The polymer further comprises the residue of an ethylenically unsaturated comonomer. In general, the ethylenically unsaturated comonomer comprises at least one member selected from the group consisting of acrylic acid, methacrylic acid, hydroxyethyl acrylate, hydroxyethyl methacrylate, hydroxypropyl acrylate, hydroxypropyl methacrylate, hydroxybutyl acrylate, hydroxybutyl methacrylate, glycidyl acrylate, glycidyl methacrylate, isocyanotoethyl methacrylate, acryloxypropionic acid, mixtures of polyacrylic acids, mixtures of polymethacrylic acids, metaisopropenyl-α, α-dimethylbenzyl isocyanate, and maleic anhydride. Preferably, the ethylenically unsaturated comonomer comprises at least one member selected from the group consisting of acrylic acid, methacrylic acid, glycidyl methacrylate, hydroxyethyl acrylate, hydroxyethyl methacrylate, hydroxypropyl acrylate, and hydroxypropyl methacrylate.

The first sterically-hindered monomer is at least one member selected from the group consisting of an aliphatic branched acyclic ester of acrylic acid, and aliphatic branched acyclic ester of methacrylic acid, a cyclic ester of acrylic acid, and a cyclic ester of methacrylic acid. Preferably, the first sterically hindered monomer comprises at least one member selected from the group consisting of isobornyl methacrylate, tetrahydrofurfuryl methacrylate, cyclohexyl methacrylate, tert-butyl methacrylate, 2-ethylhexyl methacrylate, and mixtures of branched decyl methacrylates.

The residue of the second sterically-hindered monomer may be a residue of styrene.

Alternatively, the residue of the sterically-hindered monomers may comprise both:

A. a first acrylate, which is a sterically-hindered aliphatic ester of acrylic acid or methacrylic acid, and B. a second acrylate, wherein the second acrylate is a sterically-hindered ester of acrylic acid or methacrylic acid different from the first acrylate.

The first acrylate preferably comprises at least one member selected from the group consisting of cyclohexyl methacrylate, tert-butyl methacrylate, tetrahydrofurfuryl methacrylate, and isobornyl methacrylate. The first acrylate is preferably present in the polymer in an amount of from about 5 weight percent to about 50 weight percent, based on the weight of the polymer. The second acrylate preferably comprises at least one member selected from the group consisting of 2-ethylhexyl methacrylate and mixtures of branched decyl methacrylates. Preferably, the second acrylate is present in the polymer in an amount of from about 5 weight percent to about 75 weight percent, based on the weight of the polymer. When the above acrylates are polymerized in the making of the polymer, the residue of the ethylenically unsaturated comonomer is preferably an ester of acrylic and methacrylic acid. Furthermore, the comonomer is preferably present in an amount of from about 20 weight percent to about 50 weight percent, based on the weight of the polymer.

In the process for coating a substrate according to the present invention, the process, in general, comprises the steps of:

(1) making a coating composition which comprises a polymer which consists of a residue of a sterically-hindered polymer as well as a residue of an ethylenically unsaturated comonomer having a functional site thereon capable of undergoing crosslinking after the polymer is formed, and (2) applying the coating composition to a substrate so that an uncured coating is formed, and (3) curing the uncured coating, whereby a cured coating is formed.

The sterically-hindered monomer comprises at least one member selected from the group consisting of: (i) a first sterically-hindered monomer which is a an ethylenically unsaturated ester, and (ii) a second sterically-hindered monomer which is a vinyl monomer. The residue of the vinyl monomer is, in general, present in the polymer in an amount of from 0 weight percent to about 50 weight percent, based on the weight of the polymer. However, the vinyl monomer is preferably present in the polymer in an amount of from 0 weight percent to about 25 weight percent.

The relative amount of polymer in the coating composition is, in general at least 35 weight percent of a total amount of reactive components present in the coating composition. Preferably, the polymer comprises at least 50 weight percent of a total amount of reactive components present in the coating composition. Still more preferably, the polymer comprises at least 75 weight percent of a total amount of reactive components present in the coating composition. Alternatively, the polymer comprises from about 35 to about 85 weight percent of a total amount of reactive components present in the coating composition. Preferably, the polymer comprises from about 50 to about 80 weight percent of a total amount of reactive components present in the coating composition. More preferably, the polymer comprises from about 55 to about 80 weight percent of a total amount of reactive components present in the coating composition.

In general, from about 75 weight percent (and preferably from about 90 weight percent) to about 100 weight percent of the polymer is comprised of: (1) the residue(s) of the sterically-hindered monomer(s), together with (2) the residue(s) of the ethylenically unsaturated comonomer(s). Preferably, at least 95 weight percent of the polymer consists of the residue of at least two monomers selected from the group consisting of the first sterically-hindered monomer, the second sterically-hindered monomer, and the ethylenically unsaturated comonomer. Still more preferably, from about 20 to about 80 weight percent (more preferably 25 to 70 weight percent, and still more preferably 30 to 65 weight percent) of the polymer consists of the residue of at least one monomer selected from the group consisting of the first sterically-hindered monomer and the second sterically-hindered monomer, and the amount of the second sterically-hindered monomer residue is from 0 weight percent to about 50 weight percent, based on the weight of the polymer. Still more preferably, the residue(s) of the second sterically-hindered monomer is present in the polymer in an amount of from 0 weight percent to about 25 weight percent, based on the weight of the polymer.

In general, the first sterically-hindered monomer comprises at least one member selected from the group consisting of an aliphatic branched acyclic ester of acrylic acid, and aliphatic branched acyclic ester of methacrylic acid, a cyclic ester of acrylic acid, and a cyclic ester of methacrylic acid. More specifically, the first sterically-hindered monomer comprises at least one member selected from the group consisting of isobornyl methacrylate, tetrahydrofurfuryl methacrylate, cyclohexyl methacrylate, tert-butyl methacrylate, 2-ethylhexyl methacrylate, and mixtures of branched decyl methacrylates.

Preferably the second sterically-hindered monomer is styrene.

In general, the functional site which is present on the ethylenically unsaturated comonomer comprises at least one functionality selected from the group consisting of hydroxyl, isocyanate, oxirane, carboxylic acid, and carboxylic acid anhydride. Preferably, the ethylenically unsaturated comonomer comprises at least one member selected from the group consisting of acrylic acid, methacrylic acid, hydroxyethyl acrylate, hydroxyethyl methacrylate, hydroxypropyl acrylate, hydroxypropyl methacrylate, hydroxybutyl acrylate, hydroxybutyl methacrylate, glycidyl acrylate, glycidyl methacrylate, isocyantoethyl methacrylate, acryloxypropionic acid, mixtures of polyacrylic acids, mixtures of polymethacrylic acids, meta-isopropenyl-$\alpha,\alpha$-dimethylbenzyl isocyanate, and maleic anhydride. Still more preferably, the ethylenically unsaturated comonomer comprises at least one member selected from the group consisting of acrylic acid, methacrylic acid, glycidyl methacrylate, hydroxyethyl acrylate, hydroxyethyl methacrylate, hydroxypropyl acrylate, and hydroxypropyl methacrylate.

Preferably the polymer has a theoretical $T_g$ of from about 10° C. to about 70° C., more preferably from about 25° C. to about 60° C., and still more preferably the polymer has a theoretical $T_g$ of from about 17° C. to about 46° C.

The present invention also pertains to a method of reducing the susceptibility of a cured coating to environmental etching. The method comprises reacting a sufficient amount of a polymer with other reactive components in a coating composition to be cured during curing of the coating, wherein the polymer comprises the residues of:

A. a sufficient amount of a sterically-hindered monomer, and

B. a sufficient amount of an ethylenically unsaturated comonomer which has functional sites capable of undergoing crosslinking after forming the polymer.

The amount of any sterically-hindered vinyl monomer residue present is, in general, from 0 weight percent to about 50 weight percent, based on the weight of the polymer. The amounts are sufficient to reduce the susceptibility of the cured coating formed therefrom to environmental etching. Preferably the amount of any sterically-hindered vinyl monomer residue present is from 0 weight percent to about 25 weight percent. Preferably the polymer has a theoretical $T_g$ of from about 1° C. to about 70° C. Preferably from about 20 to about 80 weight percent of the polymer consists of the residue of a sterically-hindered monomer.

The present invention also pertains to a coated article comprising a substrate having a cured coating thereon, wherein the cured coating comprises a sufficient amount of a residue of a sterically hindered monomer and a residue of an ethylenically unsaturated comonomer. The amounts of the residue of the monomer and the residue of the comonomer are sufficient to produce a coating exhibiting enhanced environmental etch resistance. Any sterically-hindered vinyl monomer residue in the coating is present in an amount of from 0 weight percent to about 67 weight percent, based on a total of: (1)the weight of the sterically hindered monomer residue present in the coating, and (2) the weight of the ethylenically unsaturated comonomer residue present in the coating.

In accord with the composition and process of the present invention, in the coated article of the present invention the residue of the sterically-hindered monomer may, in general, be at least one residue which is selected from the group consisting of:

i. residues of a first sterically-hindered monomer, wherein the first monomer is an ethylenically unsaturated carboxylic ester, ii. residues of a second sterically-hindered monomer, wherein the second monomer is a vinyl monomer.

In general, the residue of the first sterically-hindered monomer comprises at least one residue selected from the group consisting of residues of: an aliphatic branched acyclic ester of acrylic acid, an aliphatic branched acyclic ester of methacrylic acid, a cyclic ester of acrylic acid, and a cyclic ester of methacrylic acid. Preferably the residue of the first sterically-hindered monomer comprises at least one residue selected from the group consisting of residues of: isobornyl methacrylate, tetrahydrofurfuryl methacrylate, cyclohexyl methacrylate, tert-butyl methacrylate, 2-ethylhexyl methacrylate, and mixtures of branched decyl methacrylates.

In general, the residue of the ethylenically unsaturated comonomer, present in the article of the present invention, comprises at least one residue selected from the group consisting of residues of: acrylic acid, methacrylic acid, hydroxyethyl acrylate, hydroxyethyl methacrylate, hydroxypropyl acrylate, hydroxypropyl methacrylate, hydroxybutyl acrylate, hydroxybutyl methacrylate, glycidyl acrylate, glycidyl methacrylate, isocyantoethyl methacrylate, acryloxypropionic acid, mixtures of polyacrylic acids, mixtures of polymethacrylic acids, meta-isopropenyl-$\alpha,\alpha$-dimethylbenzyl isocyanate, and maleic anhydride. Preferably, the residue of the ethylenically unsaturated comonomer comprises at least one residue selected from the group consisting of residues of: acrylic acid, methacrylic acid, glycidyl methacrylate, hydroxyethyl acrylate, hydroxyethyl methacrylate, hydroxypropyl acrylate, and hydroxypropyl methacrylate.

Although the residue of the sterically-hindered vinyl monomer may, in general, be present in an amount of from 0 weight percent to about 67 weight percent (based on a total of the weight of the sterically hindered monomer residue present in the coating plus the weight of the ethylenically unsaturated comonomer residue present in the coating), preferably the sterically-hindered vinyl monomer residue is present in an amount of from 0 to about 28 weight percent.

Alternatively, the residue of the sterically-hindered monomer may comprise a first acrylate residue and a second acrylate residue. The first acrylate residue may, in general, be a residue of a sterically-hindered aliphatic ester of acrylic acid or methacrylic acid, wherein the first acrylate residue is present in the coating in an amount of from about 5 weight percent to about 50 weight percent, based on a combined weight of the residues of sterically-hindered monomers and residues of ethylenically unsaturated comonomers. Preferably, the residue of the first acrylate comprises at least one member selected from the group consisting of residues of: cyclohexyl methacrylate, tert-butyl methacrylate, tetrahydrofurfuryl methacrylate, and isobornyl methacrylate.

The second acrylate residue may, in general, be a residue of a sterically-hindered ester of acrylic acid or methacrylic acid which is different from the residue of the first acrylate. The residue of the second acrylate may, in general, be present in the coating in an amount of from about 5 weight percent to about 75 weight percent, based on the combined weight of the residues of sterically-hindered monomers and residues of ethylenically unsaturated comonomers. Preferably the residue of the second acrylate comprises at least one residue selected from the group consisting of residues of: 2-ethylhexyl methacrylate and mixtures of branched decyl methacrylates.

The residue of the ethylenically unsaturated comonomer is, in general, present in the coating in an amount of from about 20 weight percent to about 50 weight percent, based on the combined weight of the residues of sterically-hindered monomers and residues of ethylenically unsaturated comonomers.

The residue of the second sterically-hindered monomer may be a styrene residue.

Derivatives of all of the chemical species named herein may be used in the process and composition of the present invention, so long as the derivative is compatible with other ingredients in the composition, and so long as the derivative leads to obtaining the objectives of the present invention. In one embodiment of the present invention, the polymer is prepared by reacting from about 5% to 50% by weight of a cyclic aliphatic methacrylate, about 20% to about 50% by weight of a functional acrylate, or methacrylate capable of reacting with a crosslinking agent, and about 5% to about 75% by weight of other sterically hindered alkyl acrylates or methacrylates, preferably about 15% to about 45% by weight mixtures of branched decyl methacrylates which are purchased commercially as isodecyl methacrylate. The resin is combined with a crosslinking agent in a one component or two component system and cured over a solventborne or waterborne basecoat. Examples I, III, and VII are illustrative of this embodiment.

In another embodiment of the present invention, the polymer is prepared by reacting about 5% to about 50% by weight, preferably about 10% to about 30% by weight, of tertbutyl methacrylate; about 20% to about 50% by weight hydroxyl alkyl acrylate or methacrylate, preferably about 35% to about 45% by weight hydroxyl alkyl methacrylate; and about 5% to about 75% by weight of a branched alkyl acrylate or methacrylate, preferably about 25% to about 45% by weight isodecyl methacrylate or 2-ethylhexyl methacrylate. The polymer is combined with a crosslinking agent in a one or two component system and may be cured over a solventborne or waterborne basecoat. Examples II and VI are illustrative of this embodiment.

In another embodiment of the present invention, a polymer is prepared from monomers selected and apportioned such that the polymer produced therefrom has a theoretical $T_g$ ranging from about 17° to about 46° C. The polymer is combined with a crosslinker in a one component system and cured over a basecoat. Examples IV and V are illustrative of this embodiment.

In another embodiment of the present invention, a polymer is prepared from monomers selected and apportioned such that the polymer produced has a theoretical $T_g$ ranging from about 25° to about 65° C. Preferred crosslinking agents are the isocyanurates of hexamethylenediisocyante (HDI) or the isocyanurate of isphorrone diisocyanate, preferably mixtures of about 1/99 to about 70/30, more preferably about 5/95 to about 30/70, ratio of equivalents of the agents respectively, and most preferably a blend of 15% equivalents of the isocyanurate of HDI and 85% equivalents of the isocyanurate of isophoronediisocyanate (IPDI).

In the following examples, coatings were prepared from the polymers and compositions of the present invention, and subjected to test procedures to determine and illustrate the susceptibility of the coating to environmental etching.

In the examples, the following describes the test procedures:

Weight non-volatile (WNV) content of each ready-to-spray sample was determined by the difference in weight on a Metler Analytical Balance before and after exposure for 60 minutes at 110° C. bake according to ASTM D 3960-81 and ASTM D 2369-81.

A gradient bar etch test was conducted to approximate the environmental etch resistance of each clearcoat applied over black base coated panels, by exposure in a gradient oven. The gradient oven is a flat plate having heated sections such that the temperature of the plate surface increases incrementally from one end to the other. The temperature at which a water soluble electrolyte solution will etch into a clearcoat was determined by spotting identical rows of droplets onto the surface of the panel having a coating to be evaluated. The oven range was set from 40° C. to 75° C. and maintained for 30 minutes by which time the drops have evaporated. After washing off the panel, the area where the drops lay is inspected for signs of etching such as small pits, hairline ring structures, or slight film erosion. The onset of etch was read to the nearest degree temperature and the corresponding bar temperature was recorded. The higher the degree temperature at which the onset of etch occurs indicates greater etch resistance of the coating. The electrolyte solution contained potassium chloride, fumaric acid, mono-calcium phosphate, tri-calcium phosphate, Surfynol 104 (Available from Air Products of Allentown Pa.), and distilled water. The tests were conducted in accordance with "BASF Gradient Bar Etch Resistance Test" which is hereby incorporated by reference.

Field etch resistance was tested by actual outdoor exposure at sites known for their heavy environmental fallout. Panels, 10 inches by 10 inches, were prepared of standard black basecoat and a clearcoat which was to be evaluated for resistance to environmental etch. The panels were then exposed horizontally at a 0° angle on elevated racks for 3 months. Visual evaluations were done for pitting and ring etching after 1, 2, and 3 months. The panels were rated on a scale from 0 to 10, with 0 corresponding to no observable defects; 1–2 corresponding to slight etching such as the onset of spotting observable by the trained eye; 3–4 corresponding to moderate etching such as spotting with the onset of erosion of the coating; 5–6 corresponding to severe etching such as pitting; and 7–10 corresponding to total etch failure requiring refinishing of the coating.

The glass transition temperature ($T_g$) is described in PRINCIPLES OF POLYMER CHEMISTRY, Flory, Cornell University Press, Ithaca, NY, 1953, pages 52–57. The theoretical $T_g$ can be calculated as described by Fox in Bull. Amer. Physic Soc. Vol. 1, No. 2, page 123 (1956). The $T_g$ can be determined experimentally such as by using a penetrometer such as a DuPont 940 Thermomechanical Analyzer. The $T_g$ of the polymers as used herein refers to the calculated value unless otherwise indicated.

EXAMPLE I

A suitable reactor was charged with 316.5 parts of xylene and 105.5 parts of toluene and was heated to reflux (128° C.) under an inert atmosphere. After a reflux had been established, the inert gas was turned off and a mixture of 342.1 parts isodecyl methacrylate, 493.4 parts hydroxypropyl methacrylate, 282.2 parts tetrahydrofurfuryl methacrylate, 11.3 parts styrene, 96 parts t-amyl peroxy-2-ethylhexanoate, and 79 parts toluene was added at a constant rate over a period of 3 hours. A gentle reflux was maintained throughout the addition. When all of the mixture had been added, 24 parts xylene were used to rinse the line and were added to the reaction vessel. The reflux (125° C.) was maintained for another 30 minutes and then the batch was cooled and filtered. The measured weight NV was 64.7%, the Gardner-Holt viscosity was Z5, and the acid number was 3.6 mg KOH/g NV. The $M_n$ was 3508, the $M_w$ was 6420, and the polydispersity (D) was 1.8 as measured by GPC versus a polystyrene standard. The theoretical hydroxyl number was 170 mg KOH/g NV. The theoretical $T_g$ of the polymer as calculated from the Fox equation was 23° C. The polymer solution is hereafter referred to as RI.

EXAMPLE II

A suitable reactor was charged with 422 parts of xylene and heated to reflux (138° C.) under an inert atmosphere. After a reflux had been established, the inert gas was turned off and a mixture of 353.4 parts isodecyl methacrylate, 493.4 parts hydroxypropyl methacrylate, 282.2 parts tert-butyl methacrylate, 96 parts t-amyl perxoy-2-ethylhexanoate, and 79 parts xylene was added at a constant rate over a period of 3.3 hours. A gentle reflux was maintained throughout the addition. When all of the mixture had been added, 24 parts xylene were used to rinse the line and were added to the reaction vessel. The reflux (141° C.) was maintained for another 30 minutes and then the batch was cooled and filtered. The measured weight NV was 59.5%, the Gardner-Holt viscosity was Y, and the acid number was 3.4 mg KOH/g NV. The $M_n$ was 2646, the $M_w$ was 4242, and the polydispersity (D) was 1.6 as measured by GPC versus a polystyrene standard. The theoretical hydroxyl number was 170 mg KOH/g NV. The theoretical $T_g$ of the polymer as calculated from the Fox equation was 32° C. The polymer solution is hereafter referred to as RII.

EXAMPLE III

A suitable reactor was charged with 422 parts of xylene and heated to reflux (138° C.) under an inert atmosphere. After a reflux had been established, the inert gas was turned off and a mixture of 353.4 parts 2-ethylhexyl methacrylate, 493.4 parts hydroxypropyl methacrylate, 282.2 parts isobornyl methacrylate, 96 parts t-amyl peroxy-2-ethylhexanoate, and 79 parts xylene was added at a constant rate over a period of 3 hours. A gentle reflux was maintained throughout the addition. When all of the mixture had been added, 24 parts xylene were used to rinse the line and were added to the reaction vessel. The reflux (138° C.) was maintained for another 30 minutes and then the batch was cooled and filtered. The measured weight NV was 66.3%, the Gardner-Holt viscosity was $Z_6$, and the acid number was 3.6 mg KOH/g NV. The $M_n$ was 2411, the $M_w$ was 3455, and the polydispersity (D) was 1.6, as measured by GPC versus a polystyrene standard. The theoretical hydroxyl number was 170 mg KOH/g NV. The theoretical $T_g$ of the polymer as calculated from the Fox equation was 58° C. The polymer solution is hereafter referred to as RIII.

EXAMPLE IV

A suitable reactor was charged with 525 parts of methyl isobutyl ketone and 525 parts of xylene and was heated to reflux (122° C.–124° C.) under an inert atmosphere. After a reflux had been established, the inert gas was turned off and a mixture of 980 parts hydroxyethyl methacrylate, 791.4 parts 2-ethylhexyl methacrylate, 612.5 parts styrene, 66.1 parts methacrylic acid, and 200.9 parts t-amyl peroxy-2-ethylhexanoate was added at a constant rate over a period of 3 hours. A moderate reflux was maintained throughout the addition. After all of the mixture had been added, the system was maintained at reflux (124° C.) for 30 minutes. The batch was then cooled and filtered. The measured weight NV was 70.0%, the Gardner-Holt viscosity was Z6+, and the acid number was 20.5 mg KOH/g NV. The $M_n$ was 3556, the $M_w$ was 6043, and the polydispersity (D) was 1.7 as measured by GPC versus a polystyrene standard. The theoretical hydroxyl number was 173 mg KOH/g NV. The theoretical $T_g$ of the polymer as calculated from the Fox equation was 41° C. The polymer solution is hereafter referred to as RIV.

EXAMPLE V

A suitable reactor was charged with 525 parts of methyl isobutyl ketone and 525 parts of xylene and heated to reflux (at 122°–124° C.) under an inert atmosphere. After a reflux had been established, the inert gas was turned off and a mixture of 980 parts hydroxyethyl methacrylate, 1408.8 parts 2-ethylhexyl methacrylate, 66.2 parts methyacrylic acid, and 200.9 parts t-amyl peroxy-2-ethylhexanoate was added at a constant rate over a period of 3 hours. A moderate reflux was maintained throughout the addition. After all of the mixture had been added the system was maintained at reflux (124° C.) for 30 minutes. The batch was then cooled and filtered. The measured weight NV was 67.5%, the Gardner-Holt viscosity was Z4, and the acid number was about 21.2 mg KOH/g NV. The $M_n$ was 3390, the $M_w$ was 5351, and the polydispersity (D) was 1.6 as measured by GPC versus a polystyrene standard. The theoretical hydroxyl number was 173 mg KOH/g NV. The theoretical $T_g$ of the polymer as calculated from the Fox equation was 17° C. The polymer solution is hereafter referred to as RV.

EXAMPLE VI

A suitable reactor was charged with 416.3 parts of methyl isobutyl ketone and 416.3 parts of xylene and was heated to reflux (122°–124° C.) under an inert atmosphere. After a reflux had been established, the inert gas was turned off and a mixture of 957.5 parts hydroxyethyl methacrylate, 598.4 parts t-butyl methacrylate, 24.0 parts styrene, 749.2 parts 2-ethylhexyl methacrylate, 64.6 parts methacrylic acid, and 192.3 parts t-amyl peroxy-2-ethylhexanoate was added at a constant rate over a period of 3 hours. A moderate reflux was maintained throughout the addition. After all of the mixture had been added the system was maintained at reflux (124° C.) for 30 minutes. The batch was then cooled and filtered. The measured weight NV was 65.1%, the Gardner-Holt viscosity was Z4+, and the acid number was 21.0 mg KOH/g NV. The $M_n$ was 3461, the $M_w$ was 5361, and the polydispersity (D) was 1.5 as measured by GPC versus a polystyrene standard. The theoretical hydroxyl number was 173 mg KOH/g NV. The theoretical $T_g$ of the polymer as calculated from the Fox equation was 46° C. The polymer solution is hereafter referred to as RVI.

EXAMPLE VII

A suitable reactor was charged with 550 parts of amyl acetate and 366.7 parts of xylene and was heated to reflux (140°–143° C.) under an inert atmosphere. After a reflux had been established, the inert gas was turned off and a mixture of 995.3 parts hydroxyethyl methacrylate, 638 parts isobornyl methacrylate, 867.7 parts isodecyl methacrylate, 51.1 parts methacrylic acid and 217 parts t-amyl peroxy-2-ethylhexanoate was added at a constant rate over a period of 4 hours. A moderate reflux was maintained throughout the addition. After all of the mixture had been added the system was maintained at reflux (140° C.) for 1 hour. The batch was then cooled and filtered. The measured weight NV was 62.5%, the Gardner-Holt viscosity was Z2–, and the acid number was 18.4 mg KOH/g NV. The $M_n$ was 2783, the $M_w$ was 4424, the polydispersity (D) was 1.6 as measured by GPC versus a polystyrene standard. The theoretical hydroxyl number is 168 mg KOH/g NV. The theoretical $T_g$ of the polymer as calculated from the Fox equation was 34° C. The polymer solution is hereafter referred to as RVII

EXAMPLE VIII

A suitable reactor was charged with 17.7 parts of Aromatic 100 (available from Exxon Chemical Co. of Houston, Tex.) and was heated to reflux (162° C.) under an inert atmosphere. After a reflux had been established, the inert gas was turned off and a mixture of 1.4 parts of methacrylic acid, 15.4 parts of hydroxypropyl methacrylate, 14.7 parts of butyl methacrylate, 28.1 parts of butyl acrylate, 10.5 parts of methyl methacrylate, 3.0 parts of di-t-butyl peroxide, and 7.5 parts of Aromatic 100 was added at a constant rate over a four hour period. A moderate reflux was maintained throughout the addition. When all of the mixture had been added, the reflux temperature was maintained for an additional two hours. The mixture was then cooled and filtered. The measured weight non-volatile was 73.0%, the Gardner-Holt viscosity was Y, and the acid number was 20. The $M_n$ was 2340, the $M_w$ was 3800, and the polydispersity (D was 1.62 as measured by GPC versus a polystyrene standard. The theoretical hydroxyl number was 85 mg KOH/g NV. The theoretical $T_g$ of the polymer as calculated from the Fox equation was 20° C. The polymer solution is hereafter referred to as RVIII.

EXAMPLE IX

A suitable reactor was charged with 18.2 parts of methyl propyl ketone and heated to reflux (102° C.) under an inert atmosphere. After a reflux had been established, the inert gas was turned off and a mixture of 17.3 parts. of methacrylic acid, 15.4 parts of hydroxypropyl methacrylate, 28 parts of butyl methacrylate, 14.8 parts of butyl acrylate, 10.4 parts of methyl methacrylate, 29.4 parts of t-butyl peroctoate, and 6 parts of methyl propyl ketone was added at a constant rate over a three hour period. A moderate reflux was maintained throughout the add. When all of the mixture had been added, the reflux temperature was maintained for an additional two hours. The mixture was then cooled and filtered. The measured weight non-volatile is 65.0%, the Gardner-Holt viscosity was Y, and the acid number was 17.5. The $M_n$ was 8,995, the $M_w$ was 18,002, and the polydispersity (D) was 2.00 as measured by GPC versus a polystyrene standard. The theoretical hydroxyl number was 85 mg KOH/g NV. The theoretical $T_g$ of the polymer as calculated from the Fox equations was 20° C. The polymer solution is hereafter referred to as RIX.

EXAMPLE X

A suitable reactor was charged with 18.2 parts of Aromatic 100 and heated to reflux (162° C.) under an inert atmosphere. After a reflux had been established, the inert gas was turned off and a mixture of 14.4 parts of styrene, 11.5 parts of 2-ethylhexyl acrylate, 32.3 parts of Tone M-100 (available from Union Carbide, of Danbury, Conn.), 2.2 parts of acrylic acid, 11.5 parts of butyl methacrylate, 8.6 parts of a blend of eumene hydroperoxide/dicumyl peroxide, and 1 part of Aromatic 100 was added at a constant rate over a four hour period. A moderate reflux was maintained throughout the addition. When all of the mixture had been added, the reflux temperature was maintained for an additional three hours. The mixture was then cooled and filtered. The measured weight non-volatile was 75.0%, the Gardner-Holt viscosity was Y, and the acid number was 20. The $M_n$ was 2454, the $M_w$ was 10,385, and the polydispersity (D) was 4.23 as measured by GPC versus a polystyrene standard. The theoretical hydroxyl number was 73 mg KOH/g NV. The theoretical $T_g$ of the polymer as calculated from the Fox equation was –14° C. The polymer solution is hereafter referred to as RX.

EXAMPLE XI

Preparation of a Nonionic Black Waterborne Basecoat

| | |
|---|---|
| A) Laponite RD: (available from Laporte Industries of Saddlebrook, N.J.) | 3 parts by weight |
| Pluriol P900 (available from BASF Corporation of Parsippany, N.J.) | 3 parts by weight |
| Deionized Water | 16.0 parts by weight |
| B) Melamine (Cymel 303, available from American Cyanamid Company of Wayne, N.J.) | 12.0 parts by weight |
| Ethylene Glycol Monobutyl Ether | 4.5 parts by weight |
| C) Nonionic Urethane Dispersion (From Example 3 of U.S. Pat. No. 4,794,147) | 30.0 parts by weight |
| D) Black Grind Paste (from Example XII) | 18.0 parts by weight |
| E) Blocked Sulfonic Acid Catalyst | 2.5 parts by weight |
| F) Deionized Water | 11.0 parts by weight |

Part A was mixed under high agitation for two hours. Part B was added slowly under agitation followed by Part C. Part D was ground separately in a mill. Part D and Part E were then added, under agitation. Final adjustments in viscosity were made with Part F (deionized water). The pH of the basecoat was 6.0–8.0

EXAMPLE XII

Preparation of a Carbon Black Pigment Paste Dispersion of Carbon Black Pigments

Nonionic urethane dispersions have been used to mill carbon black pigments obtained from Cabot Corporation of Edison, N.J. (more specifically Cabot Black Pearls 1300), as follows:

| | Grams | Grams Non-Volatile |
|---|---|---|
| Nonionic Urethane Dispersion (from Example 5B of U.S. Pat. No. 4,794,147) | 2800 | 896 |
| Cabot Black Pearls 1300 | 224 | 224 |

The urethane dispersion was charged into a two gallon vessel equipped with a propeller type agitator. The dry pigment was added to the dispersion. Stirring was continued for 30 minutes after the pigment had been added. Deionized water was used to obtain a viscosity of 50–85 Krebs units (200–1000 cps). The slurry was then added to an attritor (as supplied by Union Process, Akron, Ohio), wherein the attritor had been charged with stainless steel shot. After 4–8 hours of milling, the particle size was reduced to 6–12 microns.

EXAMPLE XIII

This example illustrates the preparation of clearcoat which was applied over a waterborne basecoat prepared as described herein and evaluated for etch resistance.

The following ingredients were mixed together in an appropriate vessel under moderate agitation with a paddle stirrer in the following order:

| Ingredient | Parts |
|---|---|
| RI, RII, or RVII | 60.0 |
| Butanol | 3.5 |
| Cymel 1158 (available from American Cyanamid of Wayne, N.J.) | 21.2 |
| Luwipol 010 (available from BASF AG of Ludwigshafen, West Germany) | 5.0 |
| Tinuvin 1130 | 1.5 |
| 2-ethylhexanol | 2.0 |
| Tinuvin 144 | 4.0 |
| Aromatic 100 | 2.0 |
| Xylene | 5.0 |

Tinuvin 1130 and Tinuvin 144 are available from Ciba-Geigy of Ardsley, N.Y.

EXAMPLE XIV

This example illustrates the preparation of a high solids basecoat over which the coating to be evaluated for etch resistance is applied.

The following ingredients were mixed together in an appropriate vessel under moderate agitation with a paddle stirrer in the following order:

| Ingredient | Parts |
|---|---|
| RX | 28.85 |
| Resimene 747 | 10.29 |
| Microgel | 22.44 |
| Nacure 5225 | 0.75 |
| Carbon Black Paste (from Example XV) | 4.90 |
| Xylene | 47.10 |

Resimene 747 is a hexamethoxymethyl melamine available from Monsanto Chemical Company of Springfield, Mass.

Microgel is an acrylic microgel as described in U.S. Pat. No. 4,240,932, the disclosure of which is hereby incorporated by reference.

Nacure 5225 is a blocked dodecylbenzenesulfonic acid available from King Industries.

EXAMPLE XV

Preparation of Carbon Black Pigment Paste

In a mixing vessel 32.1 grams of polymer solution RX, 16.1 grams of Aromatic 100, and 6.3 grams of xylene were added and agitated for 30 minutes. Added to this mixture were 6.0 grams of High Color Carbon Black, available from Cabot Corporation of Edison, N.J. The resulting mixture was ground in an attritor for five hours to a particle size of 0–10 microns. To the attritor were added 34.4 grams of polymer solution RX and 5.0 grams of xylene, and the mixture was ground for an additional two hours to a particle size of 0–10 microns. The final viscosity was 65 Kreb units, pigment weight percent was 6.00, and the polymer weight percent was 49.94. The prepared mixture is hereafter referred to as carbon black paste.

EXAMPLE XVI

This example illustrates the preparation of a control clearcoat composition formulation utilizing polymer solutions RVIII and RIX.

The following ingredients were mixed together in an appropriate vessel under moderate agitation with a paddle stirrer in the following order:

| Ingredient | Parts |
| --- | --- |
| RVIII | 50.9 |
| RIX | 50.9 |
| Resimene 755 | 33.0 |
| Tinuvin 900 | 2.0 |
| Nacure 5225 | 3.4 |
| Aromatic 100 | 10.0 |
| Xylene | 20.1 |

Tinuvin 900 is available from Ciba-Geigy of Ardsley, N.Y.

EXAMPLE XVII

This example illustrates the preparation of a clearcoat composition using one of the polymer solutions RIII, RIV, RV or RVI to be applied to a high solids basecoat prepared in accordance with Example XIV and evaluated for etch resistance.

The following ingredients were mixed together in an appropriate vessel under moderate agitation with a paddle stirrer in the following order:

| Ingredient | Parts |
| --- | --- |
| RIII, RIV, RV or RVI | 91.0 |
| Resimene 755 | 30.0 |
| Tinuvin 900 | 2.0 |
| Nacure 5225 | 3.4 |
| Aromatic 100 | 5.0 |
| Xylene | 36.2 |

EXAMPLE XVIII

Basecoats and clearcoats were prepared in the previous examples according to the following Table and were applied and cured on a prepared substrate (as described in U.S. Pat. Nos. 4,720,528 and 4,794,147). The coated substrate was then tested using the BASF Gradient Bar Etch Resistance Test (GB) and Field Etch Resistance (FE) testing as set forth hereinabove. The results of the testing are listed in the table and serve to illustrate the utility of the claimed invention.

| Polymer Example | Clearcoat Example | Basecoat Example | GB | FE |
| --- | --- | --- | --- | --- |
| RI | XIII | XI | 167 | — |
| RII | XIII | XI | 167 | 3 |
| RIII | XVII | XIV | 157 | — |
| RIV | XVII | XIV | 151 | 2 |
| RV | XVII | XIV | 144 | 5 |
| RVI | XVII | XIV | 151 | 2 |
| RVII | XIII | XI | 157 | 3 |
| RVIII and RIX | XVI | XIV | 109 | 10 |

The ranges defined herein are intended to convey the invention to include the entire range so defined and any sub-range or multiple sub-ranges within the defined range.

We claim:

1. A coated article comprising a substrate having a cured coating thereon, wherein the cured coating comprises a polymer having a theoretical $T_g$ of from about 10° C. to about 70° C., wherein about 75 weight percent to about 100 weight percent of the polymer consists of residues of a sterically-hindered monomer and an ethylenically unsaturated comonomer having a functional site for crosslinking during curing in amounts sufficient to produce a coating exhibiting enhanced environmental etch resistance; and further wherein any sterically-hindered vinyl monomer residue is present in an amount of from 0 to about 67 weight percent, based on a total of the weight of the sterically hindered monomer residue and the ethylenically unsaturated comonomer residue.

2. A coated article as described in claim 1, wherein any sterically-hindered vinyl monomer residue in the coating is present in an amount of from 0 weight percent to about 25 weight percent.

3. A coated article as described in claim 1, wherein the sterically hindered monomer is at least one monomer selected from the group consisting of sterically-hindered ethylenically unsaturated carboxylic esters and sterically-hindered vinyl monomers, and further wherein the sterically-hindered monomer residue is from about 90 to about 100 weight percent and the sterically-hindered vinyl monomer residue is from 0 to about 28 weight percent, based on a total of the weight of the sterically hindered monomer residue and the ethylenically unsaturated comonomer residue.

4. A coated article as described in claim 3, wherein the sterically-hindered monomer comprises at least one monomer selected from the group consisting of aliphatic branched acyclic esters of acrylic acid, aliphatic branched acyclic esters of methacrylic acid, cyclic esters of acrylic acid, and cyclic esters of methacrylic acid.

5. A coated article as set forth in claim 3 wherein the residue of the ethylenically unsaturated comonomer comprises at least one residue selected from the group consisting of residues of: acrylic acid, methacrylic acid, hydroxyethyl acrylate, hydroxyethyl methacrylate, hydroxypropyl acrylate, hydroxypropyl methacrylate, hydroxybutyl acrylate, hydroxybutyl methacrylate, glycidyl acrylate, glycidyl methacrylate, isocyanatoethyl methacrylate, acryloxypropionic acid, mixtures of polyacrylic acids, mixtures of polymethacrylic acids, meta-isopropenyl-$\alpha,\alpha$-dimethylbenzyl isocyanate, and maleic anhydride.

6. A coated article as set forth in claim 3 wherein the residue of the ethylenically unsaturated comonomer comprises at least one residue selected from the group consisting of residues of: acrylic acid, methacrylic acid, glycidyl methacrylate, hydroxyethyl acrylate, hydroxyethyl methacrylate, hydroxypropyl acrylate, and hydroxypropyl methacrylate.

7. A coated article as described in claim 3, wherein the sterically-hindered monomer comprises at least one monomer selected from the group consisting of isobornyl methacrylate, tetrahydrofurfuryl methacrylate, cyclohexyl methacrylate, tert-butyl methacrylate, 2-ethylhexyl methacrylate, and mixtures of branched decyl methacrylates.

8. A coated article as described in claim 3, wherein the sterically-hindered vinyl monomer is styrene.

9. A coated article as described in claim 3, wherein the sterically-hindered monomer comprises:

A. from about 5 to about 50 weight percent of a first acrylate residue that is a residue of a sterically-hindered aliphatic ester of acrylic acid or methacrylic acid, and B. from about 5 to about 75 weight percent of a second acrylate residue that is a residue of a sterically-hindered ester of acrylic acid or methacrylic acid different from the first acrylate, and further wherein the residue of the ethylenically unsaturated comonomer is present in an amount of from about 20 to about 50 weight percent, all weight percentages being based on the combined weight of the residues of sterically-hindered monomers and residues of ethylenically unsaturated comonomers.

10. A coated article as set forth in claim 9 wherein the first acrylate comprises at least one member selected from the group consisting of cyclohexyl methacrylate, tert-butyl methacrylate, tetrahydrofurfuryl methacrylate, and isobornyl methacrylate.

11. A coated article as set forth in claim 9 wherein the second acrylate comprises at least one monomer selected from the group consisting of 2-ethylhexyl methacrylate and mixtures of branched decyl methacrylates.

* * * * *